United States Patent [19]

Eyb

[11] Patent Number: 4,819,982
[45] Date of Patent: Apr. 11, 1989

[54] ROTATABLE TOP FOR A PASSENGER CAR

[75] Inventor: Wolfgang Eyb, Leonberg, Fed. Rep. of Germany

[73] Assignee: Dr. Ing. h.c.F. Porsche Aktiengesellschaft, Stuttgart, Fed. Rep. of Germany

[21] Appl. No.: 151,190

[22] Filed: Feb. 1, 1988

[30] Foreign Application Priority Data

Jan. 31, 1987 [DE] . Fed. Rep. of Germany ....... 3702901

[51] Int. Cl.$^4$ ................................................ B60J 7/16
[52] U.S. Cl. ...................................... 296/107; 296/136
[58] Field of Search ............... 296/107, 186, 116, 117, 296/2, 6, 136

[56] References Cited

U.S. PATENT DOCUMENTS

| | | | |
|---|---|---|---|
| 1,622,899 | 3/1927 | Barnes | 296/107 |
| 1,819,545 | 8/1931 | Delp | 296/107 |
| 1,940,444 | 12/1933 | Burgman | 296/117 X |
| 2,007,873 | 7/1935 | Paulin | 296/107 X |
| 2,210,590 | 8/1940 | Jobst | 296/107 |
| 2,869,923 | 1/1959 | Mulichak | 296/117 |
| 2,939,742 | 6/1960 | Dardarian et al. | 296/107 |

FOREIGN PATENT DOCUMENTS

| | | | |
|---|---|---|---|
| 3317603 | 11/1984 | Fed. Rep. of Germany | 296/107 |
| 1579464 | 8/1969 | France | 296/107 |
| 218425 | 9/1986 | Japan | 296/107 |

Primary Examiner—Dennis H. Pedder
Attorney, Agent, or Firm—Barnes & Thornburg

[57] ABSTRACT

A fixed folding top for a passenger car extends from a windshield frame to a rear lid and can be swivelled around a stationery swivelling axis extending transversely to the longitudinal direction of the vehicle from a closed position into an open position and vice versa. A cupola-shaped end area of the folding top that in driving direction extends essentially behind a side door, extends with its lower edge to the rear lid. In order to improve the stiffness of the folding top, a plate-shaped element is arranged adjacent to the lower edge of the cupola-shaped end area and is aligned approximately horizontally and, at least with one end that is located in the rear in the driving direction, is connected firmly with the folding top to form an exterior cover in the open position of the top.

12 Claims, 4 Drawing Sheets

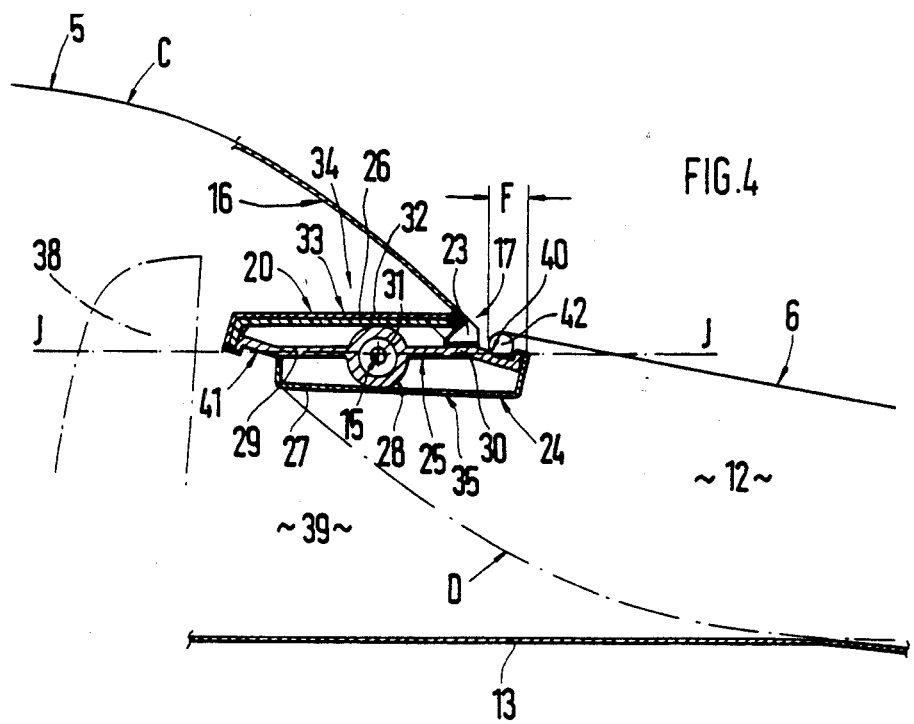
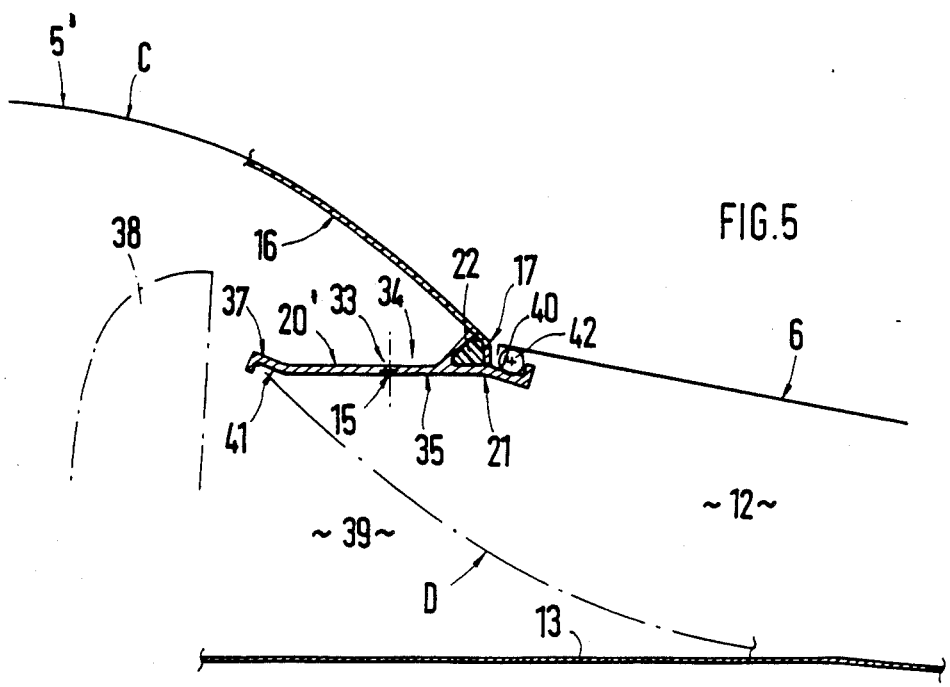

ROTATABLE TOP FOR A PASSENGER CAR

BACKGROUND AND SUMMARY OF THE INVENTION

The invention relates to a fixed folding top for a passenger car that extends from a windshield frame to a rear lid and can be swivelled from a closed into an open position and vice versa around a stationary swivelling axis extending transversely to the longitudinal direction of the vehicle, a cupola-shaped end area of the folding top that extends in driving direction essentially behind a side door, with a lower edge, extending to the rear lid.

A folding top of the initially mentioned type is found in U.S. Pat. No. 2,869,923. This arrangement has the disadvantages that the folding top, particularly in the area of its coupling to the body, does not have sufficient stiffness so that, during the driving operation, disturbing deformations may occur at the lower edge of the cupola-shaped end area of the folding top that, under certain circumstances, may result in an impairment of its function. Also, when the folding top is opened up, the space between the seats and the rear lid is not covered.

It is an object of the invention to take such measures with a folding top that the stiffness of the folding top, particularly in the cupola-shaped end area, is improved and it functions well.

According to the invention, this objective is achieved by fixedly connecting a plate shaped element to the rigid top adjacent a lower edge at the rear cupola-shaped end area, which plate shaped element extend across the whole width of the cupola shaped end area. In especially preferred embodiments the plate shaped element is configured to serve as a storage shell when the roof top is closed and as a covering for the space between the rear lid and the back of an adjacent vehicle seat when the roof is moved to an open storage position under the rear lid.

Principal advantages achieved by means of the invention are that by means of the arrangement of a plate-shaped element adjacent to the lower edge of the cupola-shaped end area, an increase of the stiffness of the folding top is achieved so that distortions during the driving operation are reduced significantly and thus a good functioning of the folding top is ensured.

By means of the plate-shaped element that is connected firmly with the folding top, in addition, in the closed position of the folding top, an additional tray for the depositing of articles is created. In the open position of the folding top, an outside periphery of the plate-shaped element forms a covering of the passenger compartment by sectors so that the space between the adjacent seats and the rear lid is closed off at least from the direction of the upper side. The plate-shaped element is preferably manufactured in one piece with the folding top. By means of shaped-on areas at the front and the rear end of the plate-shape element, a perfect sealing between the folding top and the rear lid is achieved in the closed position as well as in the open position according to especially preferred embodiments of the invention.

Other objects, advantages and novel features of the present invention will become apparent from the following detailed description of the invention when considered in conjunction with the accompanying drawings.

BRIEF DESCRIPTION OF THE DRAWINGS

FIG. 4 is a sectional view taken along Line IV-IV of FIG. 3 and depicting details of the plate-shaped element constructed according to the invention; and FIG. 5 is a sectional view corresponding to FIG. 4 depicting another embodiment of the plate-shaped element.

DETAILED DESCRIPTION OF THE DRAWINGS

Figure 1:
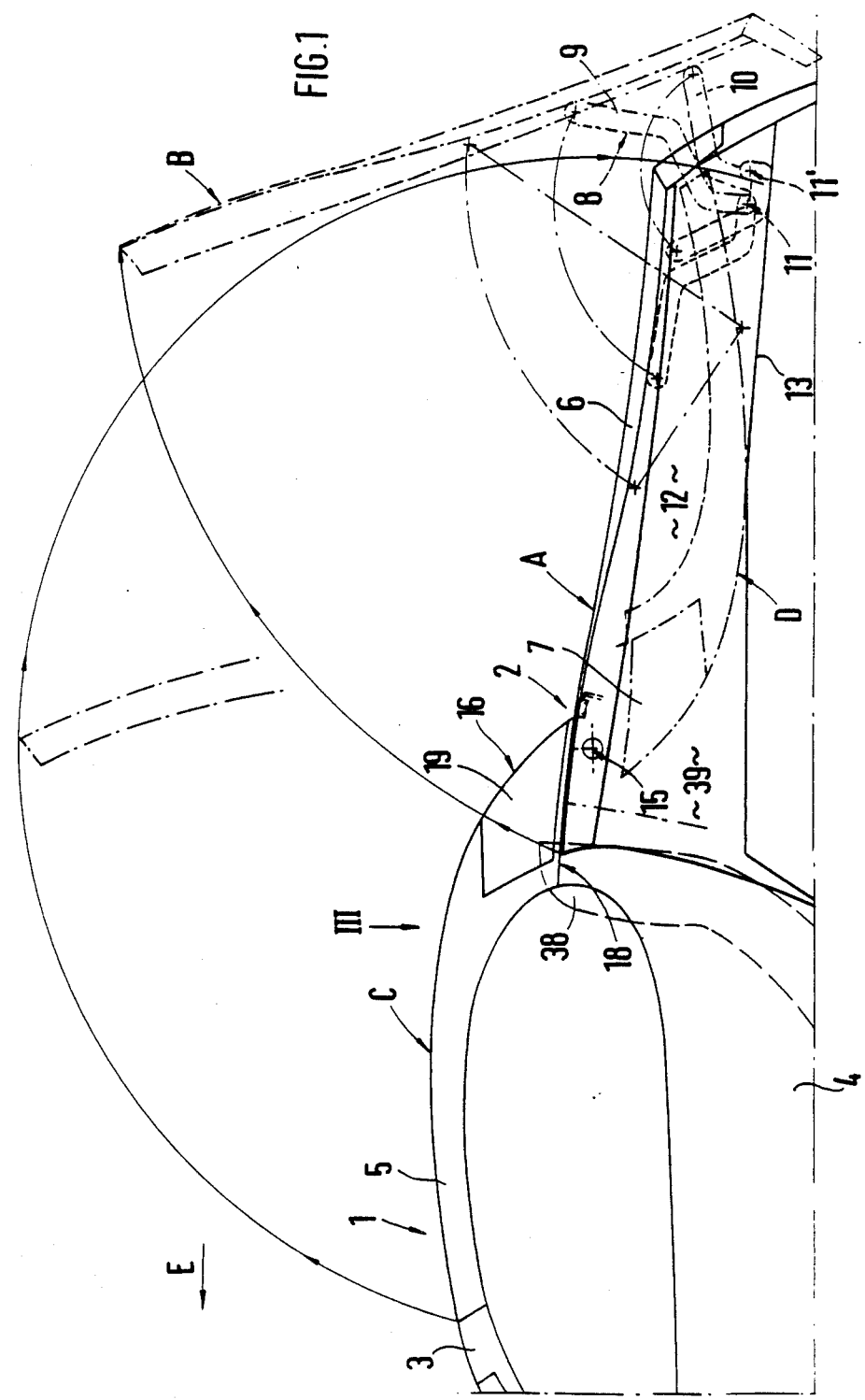
FIG. 1 is a schematic partial lateral part-sectional view of a passenger car with a fixed folding top, constructed in accordance with a preferred embodiment of the invention.
Figure 2:
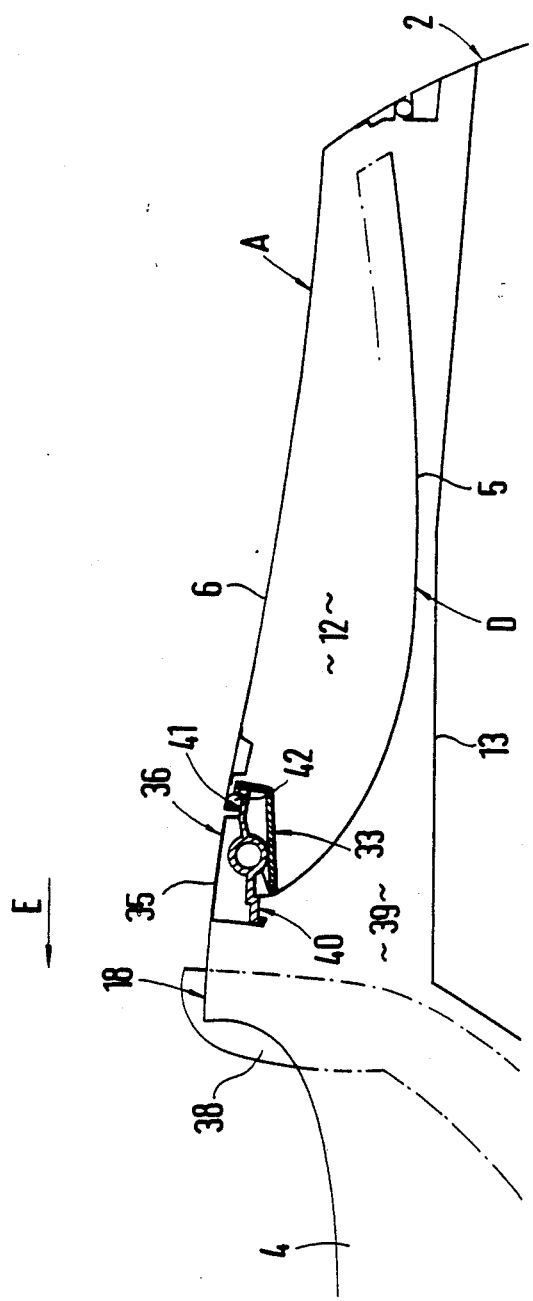
FIG. 2 is a schematic partial lateral part-sectional view of the passenger car of FIG. 1 with the folding top in an open storage position.

The passenger car 1 shown in FIG. 1 has a body 2 (Figure 2) that in the shown area comprises a windshield frame 3, a side door 4, a folding top or roof member 5, a rear lid 6 and a lateral wall 7. Referring especially to FIG. 1 the rear lid 6 can be moved by means of a four-joint hinges 8 from a closed position A shown in solid lines into an opened position B shown in dot-dash lines and vice versa. Each four-joint hinge 8 comprises two levers 9, 10 which, on one side, are connected with the rear lid 6 and, on the other side, with the body 2. The rear lid 6 can be swivelled toward the rear around pivotal points 11, 11', in which case the opened position B of the rear lid 6 is shown by means of a dash-dotted line in FIG. 1.

Below the rear lid 6, a loading space 12 is located that is defined on one side by an approximately horizontally extending floor wall 13 and, on the other side, by the rear lid 6 that is located above it.

The fixed or rigid folding top 5 that is made of plastic, metal or the like, and is formed preferably in one piece, extends from the windshield frame 3 to approximately a front end 14 of the adjacent rear lid 6. The folding top 5, in its closed position C, is held in position at the windshield frame 3 by means of locks that are not shown in detail. After these locks are opened up and the rear lid 6 is swivelled into its open position B, the folding top 5 can be swivelled toward the rear into an open position D in which it is located inside the loading space 12, around a swivelling axis 15 that extends transversely to the longitudinal direction of the vehicle and is aligned horizontally. The stationary swivelling axis 15 is arranged behind the side doors 4 with respect to driving direction E, namely in an upper area of the lateral wall 7.

A cupola-shaped end area 16 of the folding top 5 extends essentially behind the side door 4 and leads with a lower edge 17 to an extended section 18 of the side door 4 and to the front end 14 of the adjacent rear lid 6, in which case the cupola-shaped end area 16 is provided with a transparent rear window 19.

In order to increase the torsional resistance of the folding top 15—particularly in the cupola-shaped end area 16 located in the rear—the folding top 15 has plate-shaped element 20 that is disposed adjacent to the lower edge 17 of the cupola-shaped end area 16 and is aligned approximately horizontally and, at least with an end that is located in the rear in the driving direction, is connectedly firmly with the folding top 5. The plate-shaped element 20 preferably extends over the whole width of the cupola-shaped end area 16 (Figures 4 and 5). The swivelling axis 15 of the folding top 5—viewed in a longitudinal center plane H—H of the vehicle—extends inside the plate-shaped element 20, preferably, in a central transverse plane J—J, i.e., approximately in the center of the vertical and longitudinal course of the plate-shaped element 20 (FIG. 4).

According to the FIG. 5 embodiment, the plate-shaped element 20' is developed in one piece with the folding top 5' that is made of plastic. In the connecting area 21 of the folding top 5' with the plate-shaped element 20', a trapezoid shaped foam core 22 is inserted. Since the plate 20' of Figure 5 and plate 20 of FIG. 4 operate in a substantially similar manner, the following description of the FIG. 4 embodiment and its operations also applies to the corresponding structure of FIG. 5. Differences between the embodiments will be pointed out only as needed for understanding the different structures of plates 20, 20'. Also corresponding reference characters are used for corresponding functioning parts of the plates 20' and 20.

Referring to FIG. 4, the plate-shaped element 20 is formed by a separate part that is connected with a box-shaped support 23 of the folding top 5 by means of gluing, welding or the like. Part 23 is arranged on the side of the rear edge of the top 5. The plate-shaped element 20 is developed as a multi-part hollow support 24 that comprises a center part 25 that is surrounded by an upper shell 26 and a lower shell 27. The center part 25, in a center area of a longitudinal course, has a tube-shaped section 28 from which webs 29, 30 extend to both sides. The tube-shaped section 28 is used for receiving a bearing element that forms the swivelling axis 15 and may extend either over the whole width or only in lateral exterior areas of the plate-shaped element 20. The bearing elements 31 that are mounted at the folding top 5 interact with pivot bearings that are not shown in detail and are mounted on the side of the body.

The upper shell 26, according to FIG. 4, is provided with a covering 32, in which case a peripheral area 33 that is located on top in the closing position C of the folding top 5, forms a tray 34 for storing articles. According to the embodiment of FIG. 5, an end 37 of the plate-shaped element 20' or of the peripheral area 33 that is located in front in the driving direction E is extended diagonally upward, whereby a shell-shaped depositing area 34 is achieved.

The lower shell 27 is designed in such a way that, when the folding top D is opened (see FIG. 2), an outer peripheral area 35 of the plate-shaped element 20, 20' represents a covering 36 that is located in front of the rear lid 6 in the driving direction. The outer peripheral area 35 preferably extends flush with the outer shell of the rear lid 6 located behind it. The end 37 of the plate-shaped element 20' (FIG. 5) that faces away from the rear window 29 extends next to a backrest 38 of an adjacent seat.

By means of the covering 36, a partial area of a passenger compartment 39 is closed off that extends between the backrest 38 and the front end 14 of the rear lid 6.

The plate-shaped element 20, 20' in a longitudinal center view,—at its ends extending in longitudinal direction of the vehicle—has one respective receiving device 40, 41 with a U-shaped or L-shaped profile, in which case, depending on the position of the folding top 5, 5' one of these receiving devices 40, 41 forms a contact surface for a sealing body 42 of the adjacent rear lid 6.

The hose-shaped or lip-shaped sealing body 42 is mounted at the front end 14 of the rear lid 6, the rear lid 6 reaching over the plate-shaped element 20, 20' by an amount F (FIG. 4).

Figure 3:
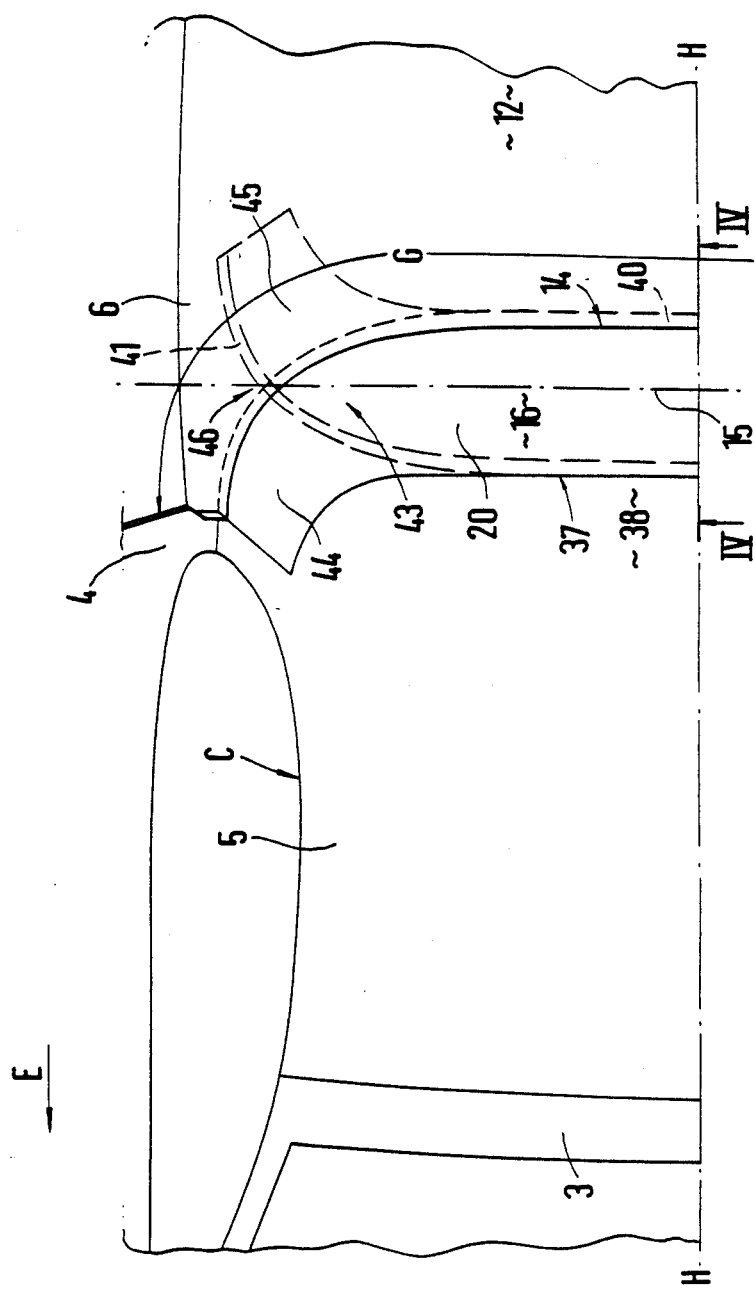
FIG. 3 is a partial top view of FIG. 1 with the folding top and the rear lid.

In the closed position of the folding top 5, 5' the sealing body 42 interacts with the receiving device 40 that projects over the folding top 5, 5' whereas, when the folding top D is opened, the receiving device 41 interacts with the sealing body 42. The receiving device 40 that is arranged outside the cupola-shaped end area 16, extends approximately in parallel to the front end 4 of the lid 6, the front end 14, in top view, having a curved course (FIG. 3).

So that also when the folding top 5, 5' is opened, a good sealing is ensured between the plate-shaped element 20, 20' and the rear lid 6, the receiving device 41, in top view, extends in a mirror-inverted way to the receiving device 42, in which case, the swivelling axis 15 forms the axis of symmetry. The plate-shaped element 20, 20' in laterally outside areas 43, has curved end sections 44, 45 that extend mirror-inverted to the swivelling axis 15, in which case, in the closed position C of the folding top 5, the receiving device 40 is arranged at the end section 44 that points in driving direction. Laterally exterior areas of the receiving device 41 are directed toward the rear—against the driving direction—and provided at the curve end section. The two receiving devices 40, 41 intersect at reference point 46 in the area of the swivelling axis 15.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A rotatable top for a passenger car having a front and a rear spaced along a longitudinal axis of the car as well as a front windshield frame, at least one side door and a rear lid, the rotatable top comprising:
   a roof member rotatably movable between open and closed positions about a swivelling axis extending transversely to the longitudinal axis of the car, the roof member extending between the front windshield frame and the rear lid, in the closed position, with a dome-shaped end area of the roof member positioned behind the side door, said end area having a lower edge, adjacent the rear lid;
   a substantially horizontal plate-spaced element positioned adjacent the lower edge of the dome-shaped end area of the roof member with at least a rear edge connected to the roof member, the plate-shaped element extending substantially over the entire width of the dome-shaped end area of the roof member;
   an upper peripheral surface of the plate-shaped element forming an interior storage surface when the roof member is in the closed position; and
   a peripheral surface of the plate-spaced element located on an outside of the vehicle when the roof member is in the open position forming an exterior cover located in front of the rear lid.

2. A rotatable top according to claim 1, wherein the swivelling axis extends inside the plate-shaped element, said swivelling axis being arranged approximately in a substantially horizontal center plane of the plate-shaped element.

3. A rotatable top according to claim 1, wherein the passenger car has at least one storage compartment, the plate-shaped member projects at least forwardly from the closed position of the roof member, and the peripheral surface located on the outside when the roof member is in the open position forms an exterior cover for the at least one storage compartment.

4. A rotatable top according to claim 1, wherein the plate-shaped element is formed integrally in one piece with the roof member.

5. A rotatable top according to claim 1, wherein the plate-shaped element is formed by a separate part that is connected with the roof member by at least one of either gluing and welding.

6. A rotatable top according to claim 5, wherein the plate-shaped element is a hollow support.

7. A rotatable top according to claim 6, wherein the hollow support has a center part that is surrounded by an upper shell and a lower shell forming, respectively, said upper and lower peripheral surfaces, the upper shell forming a rear window shelf and the lower shell forming a passenger compartment cover.

8. A rotatable top according to claim 1, wherein a bearing element is provided that forms the swivelling axis.

9. A rotatable top according to claim 1, wherein the plate-shaped element encompasses the swivelling axis.

10. A rotatable top according to claim 1, wherein the plate-shaped element has receiving means at each of two opposite ends extending in the longitudinal direction of the vehicle for forming a contact surface for a sealing body of the adjacent rear lid, one of the receiving means forming the contact surface when the top is opened and the other receiving means forming the contact surface when the top is closed.

11. A rotatable top according to claim 1, wherein an end of the plate-shaped element that faces away from a rear window of the rotatable top extends next to a backrest of an adjacent seat of the car.

12. A rotatable top according to claim 10, wherein the plate-shaped element has two sided curved end sections that each extend in a laterally exterior area of the plate-shaped element each of the curved end sections being arranged about the swivelling axis such that one side of each curved end section is inverted when the roof member is moved to either closed and open positions, the receiving means being arranged at said curved end sections.

* * * * *